(12) United States Patent
Westplate et al.

(10) Patent No.: US 11,445,849 B1
(45) Date of Patent: Sep. 20, 2022

(54) SYSTEM AND METHOD FOR HIGHLY UNIFORM PRODUCTION OF COLD-BREWED BEVERAGES HAVING EXTENDED SHELF-LIFE

(71) Applicant: Big Watt Inc., Minneapolis, MN (US)

(72) Inventors: Jason Westplate, St. Louis Park, MN (US); Lee Carter, Minneapolis, MN (US)

(73) Assignee: Big Watt Inc., Minneapolis, MN (US)

( * ) Notice: Subject to any disclaimer, the term of this patent is extended or adjusted under 35 U.S.C. 154(b) by 132 days.

(21) Appl. No.: 16/035,526

(22) Filed: Jul. 13, 2018

Related U.S. Application Data

(60) Provisional application No. 62/534,123, filed on Jul. 18, 2017.

(51) Int. Cl.
| | |
|---|---|
| *A47J 31/00* | (2006.01) |
| *A23F 5/36* | (2006.01) |
| *A47J 31/06* | (2006.01) |
| *A23F 5/16* | (2006.01) |

(52) U.S. Cl.
CPC ............ *A47J 31/002* (2013.01); *A23F 5/16* (2013.01); *A23F 5/36* (2013.01); *A47J 31/007* (2013.01); *A47J 31/06* (2013.01)

(58) Field of Classification Search
CPC ........ A47J 31/002; A47J 31/007; A47J 31/06; A23F 5/36; A23F 5/16
See application file for complete search history.

(56) References Cited

U.S. PATENT DOCUMENTS

| 2,062,109 | A | * | 11/1936 | Rogers | ...................... A23F 5/08 |
|---|---|---|---|---|---|
| | | | | | 426/473 |
| 5,724,883 | A | * | 3/1998 | Usherovich | ........... A47J 31/057 |
| | | | | | 426/433 |
| 2013/0136833 | A1 | * | 5/2013 | Vastardis | ................ A23F 5/262 |
| | | | | | 426/416 |
| 2016/0007626 | A1 | * | 1/2016 | Choi | ....................... A47J 31/44 |
| | | | | | 426/433 |

* cited by examiner

Primary Examiner — Erik Kashnikow
Assistant Examiner — Assaf Zilbering
(74) Attorney, Agent, or Firm — Barry L. Davison; Davis Wright Tremaine LLP

(57) ABSTRACT

Provided are surprisingly effective methods for producing uniform, cold-brew beverages (e.g., coffee, tea, fruit juice/extract, vegetable juice/extract, etc.) having an extended shelf-life, comprising: use of non-oxygen gas mixtures comprising hydrogen (to reduce or eliminate total packaged oxygen (TPO)), use of pressure/vacuum ports in brewing and/or conditioning chambers to provide chambered vacuum and/or pressure to enhance oxygen elimination, use of continuous mixing/agitation during the final conditioning phase to provide for even particulate suspension, use of a two-phase filtration system to provide for uniform tailoring of the amount and/or size of undissolved solids, and use of jacketed brewing and/or conditioning chambers for enhanced control of temperature, extraction uniformity and conditioning. Cold-brew beverages prepared by the methods, and systems for making same are provided. Beverages prepared by any method and packaged in a container and exposed therein to a non-oxygen gas mixture comprising hydrogen, and methods for making same are provided.

26 Claims, 3 Drawing Sheets

SYSTEM AND METHOD FOR HIGHLY UNIFORM PRODUCTION OF COLD-BREWED BEVERAGES HAVING EXTENDED SHELF-LIFE

CROSS-REFERENCE TO RELATED APPLICATION

This application claims the benefit of U.S. Provisional Patent Application No. 62/534,123, filed Jul. 18, 2017, entitled "SYSTEM AND METHOD FOR HIGHLY UNIFORM PRODUCTION OF COLD-BREWED BEVERAGES HAVING EXTENDED SHELF-LIFE," the disclosure of which is herein incorporated by reference in its entirety.

FIELD OF THE INVENTION

Aspects of the present invention relate generally to methods for producing, packaging and storing cold-brewed beverages (e.g., coffee, tea, herbal tea, fruit and/or vegetable juices/extracts, rhizome and/or tuber-based drinks, etc.), and in more particular aspects to highly uniform methods for producing, packaging and storing cold-brewed beverages having consistent, organoleptic (e.g., flavor, texture, aroma, color/appearance, feel, etc.), nutritive (e.g., vitamins, nutrients, etc.), and stability (e.g., extended shelf-life) properties. Additional aspects relate to cold-brewed beverages produced using the methods, and to systems for producing and packaging the cold-brewed beverages. Further aspect relate to beverages prepared by any method and packaged in a container and exposed therein to a non-oxygen gas mixture comprising hydrogen, and methods for making same.

BACKGROUND

Current cold-brewing methods (e.g., cold-brew coffee methods) and systems typically use carb-stoning (gasifying post-brew liquid with pressurized non-oxygen gas; e.g., forced carbonation or nitrogen bubbles) for either effervescence and/or stability purposes (e.g., to purge oxygen), and intentionally eliminate agitation during product-conditioning phases to reduce solid particulate matter (e.g., through gravity separation), and to not degrade the benefits of the gasification/carb-stoning phase (by not facilitating off-gassing). Such methods, however, do not provide for even particulate suspensions (even/consistent levels of Total Dissolved Solid; TDS), or for evenly blended immiscible oils and/or alcohols during packaging without, for example, addition of an emulsifier. Primarily due to variations in temperature, extraction rate, total dissolved solids, total package oxygen levels, and other process variables, batch-to-batch consistency/uniformity in terms of organoleptic (e.g., variations in: flavor, texture, aroma, etc.), nutritive (e.g., vitamins, nutrients, etc.), and stability (e.g., shelf-life) properties is a long-standing problem in the cold-brewed beverage art.

Additionally, due to residual oxygen, and because the low temperatures typically used in prior art cold-brew processes do not kill bacteria, shelf-life of cold-brew beverages is a major economic and safety concern of the industry, and consumers. Various approaches have been considered or put in place to address this problem. For example, Stumptown employs a fully chilled distribution network to enhance shelf-life, which is typically about 90 days for cans, 10-14 days for filled growlers, and about 40-50 days for the cold brew with milk or coconut, in each case under refrigeration. Alternatively post-brew acidification and/or pasteurization have been considered or employed, however these approaches introduce off-flavors (e.g., bitterness, etc.) and otherwise degrade nuanced flavors and overall organoleptic product quality.

SUMMARY OF THE INVENTION

Aspects of the present invention provide methods for producing, packaging and storing cold-brewed beverages having consistent (batch-to-batch uniformity) organoleptic and nutritive properties, and substantially enhanced stability (e.g., extended shelf-life of about 12-months under refrigeration).

Provided, for example, are methods for making a uniform cold-brewed coffee beverage having consistent/reproducible organoleptic and nutritional qualities, with enhanced shelf-life, comprising: mixing, with agitation in a brewing chamber, coffee with an aqueous medium at a suitable cold brew temperature and for a time sufficient to extract the coffee, to provide an aqueous coffee extract having dissolved and undissolved solids; filtering, the aqueous coffee extract to remove a majority portion of the undissolved solids, to provide a filtered aqueous coffee extract having dissolved solids and some undissolved solids; purging a conditioning chamber with non-oxygen gas comprising hydrogen to provide a purged conditioning chamber; and mixing, the filtered aqueous coffee extract in the purged conditioning chamber in the presence of the non-oxygen gas comprising hydrogen, using agitation sufficient to maintain an even or substantially even suspension of dissolved and undissolved solids, at a temperature and for a time sufficient to eliminate or substantially eliminate any remaining dissolved oxygen present in the filtered aqueous coffee extract, to provide a conditioned filtered aqueous coffee extract having dissolved solids.

In the methods, mixing, with agitation in the brewing chamber, coffee with the aqueous medium may comprise mixing with agitation at a temperature of about 180° F. or lower temperature above freezing, at ambient or lower temperature above freezing, or at a temperature of about 7° C. (approx. 45° F.). In the methods, mixing the filtered aqueous coffee extract in the purged conditioning chamber in the presence of the non-oxygen gas comprising hydrogen may comprise mixing at a temperature of about 180° F. or lower temperature above freezing, at ambient temperature or lower temperature above freezing, or at a temperature of about 7° C. (approx. 45° F.).

In the methods, the brewing chamber and the conditioning chamber may be separate chambers, and wherein filtering the aqueous coffee extract to remove the portion of the dissolved solids to provide the filtered aqueous coffee extract having dissolved solids occurs during transfer, under oxygen-free or substantially oxygen-free conditions, of the aqueous coffee extract having dissolved solids through a filtering component intermediate between the brewing chamber and the conditioning chamber. In the methods, the filtering component may comprise a filtering chamber (e.g., whirlpool-type chamber), and/or an in-line filter unit communicating between the brewing chamber and the conditioning chamber.

In the methods a second phase of filtration (further filtration) may be applied during and/or after the mixing and the conditioning in the purged conditioning chamber, under oxygen-free or substantially oxygen-free conditions, wherein at least a portion of the filtered aqueous coffee extract is further filtered to remove an additional portion of the undissolved solids, to provide a conditioned, further filtered aqueous coffee extract having dissolved solids and a lesser amount undissolved solids.

The methods may further comprise transferring, under oxygen-free or substantially oxygen-free conditions, the conditioned filtered aqueous coffee extract having dissolved and undissolved solids, or the conditioned further filtered aqueous coffee extract having dissolved and undissolved solids into sealed containers, to provide packaged cold-brewed beverage having consistent/reproducible organoleptic and nutritional qualities, with enhanced shelf-life. The methods may further comprise, after transferring, chilling the packaged cold-brewed beverage to a chilled temperature for storage. In the methods, the packaged cold-brewed beverage have, for example, an extended shelf-life of a time period selected from the group consisting of: at least 90 days, at least 180 days, at least 270 days, at least 360 days, and greater periods, in each case at a storage temperature value in a range of about 1° C. to about 4.4° C. (about 34° F. to about 40° F.). Alternatively, in the methods, the shelf-life of the cold-brewed beverage may be, e.g., a time period selected from the group consisting of: at least 90 days, at least 180 days, at least 270 days, at least 360 days, and greater periods, in each case at a storage temperature value in a range of about about 180° F. (88.2° C.) to any lower temperature above freezing, or to a temperature in any subrange therein.

In the methods, the coffee may be roasted and/or broken up (e.g., into pieces) or ground (e.g., essentially any size of grinding can be used) to facilitate extraction of the coffee. In the methods, the aqueous medium may comprise filtered and/or deionized water, in each case optionally comprising trace elements and/or a food-safe preservative (e.g., antioxidant and/or antibacterial agent(s). In the methods, the transferring temperature may be a temperature in a range of about 1° C. to about 82° C. (approx. 33° F.-180° F.).

In the methods, purging the conditioning chamber with non-oxygen gas comprising hydrogen, may comprise purging with a mixture of nitrogen and hydrogen (e.g., hydrogen at 2% of the gas mixture).

In the methods, at least one of the brewing chamber and the conditioning chamber may be jacketed (e.g., in the chamber walls, or by use of cooling coils or the like within the chamber) to provide for controlled temperature using a chilled cooling fluid pumped through the jacket (e.g., ethylene glycol jacket).

In the methods, the brewing chamber and/or the conditioning chamber may comprise one or more controllable pressure/vacuum port in controlled fluid communication with a vacuum source or the source of non-oxygen gas containing hydrogen to provide for imposing a pressure or a vacuum in the chamber(s).

Additionally provided are systems for making a uniform cold-brewed beverage having consistent/reproducible organoleptic and nutritional qualities, with enhanced shelf-life, comprising: a purgeable jacketed brewing chamber comprising a mixer and configured, in operation of the system, to mix coffee with an aqueous medium to provide an aqueous coffee extract having dissolved and undissolved solids; a filter in fluid communication with the jacketed brewing chamber and configured, in operation of the system, to filter the aqueous coffee extract to remove a majority portion of the undissolved solids, to provide a filtered aqueous coffee extract having dissolved solids and some undissolved solids; a purgeable jacketed conditioning chamber comprising a mixer and in fluid communication with the filter, and configured, in operation of the system, to mix the filtered aqueous coffee extract in the presence of a non-oxygen gas comprising hydrogen, using agitation sufficient to maintain an even or substantially even suspension of dissolved and undissolved solids; and a source of non-oxygen gas containing hydrogen in controlled fluid communication with the brewing chamber and/or the conditioning chamber.

In the systems, the jacketed brewing chamber and/or the conditioning chamber may comprise a controllable pressure/vacuum port in controlled fluid communication with a vacuum source or the source of non-oxygen gas containing hydrogen, and configured, in operation of the system, for atmospheric chambering, so that a vacuum or the non-oxygen gas containing hydrogen may be introduced into the brewing chamber and/or the conditioning chamber to eliminate oxygen from the system. In the systems, the non-oxygen gas may be a mixture of nitrogen and hydrogen, either introduced, in operation of the system, as a mixture into the jacketed brewing chamber and/or the conditioning chamber, or separately introduced whereupon the nitrogen and the hydrogen gases mix to provide a mixture of nitrogen and hydrogen in the jacketed brewing chamber and/or the conditioning chamber. In the systems, the source of non-oxygen gas may be configured to provide the non-oxygen gas under pressure to be maintained in the jacketed brewing chamber and/or the conditioning chamber.

In the systems, the brewing chamber and the conditioning chamber may be separate chambers, and wherein the filter is configured to be intermediate between the brewing chamber and the conditioning chamber. In the systems, the filter may comprises an intermediate filtering chamber (e.g., whirlpool-type chamber), and/or an in-line filter, in each case configured to be in controlled fluid communication with the brewing chamber and the conditioning chamber.

The systems may further comprise a conditioning filter in fluid communication with the conditioning chamber, and configured, in operation of the system, to further filter the filtered aqueous coffee extract to remove an additional portion of the undissolved solids. In the systems, the conditioning filter may be configured in a continuous lenticular filtration loop in fluid communication with the conditioning chamber, to provide for further filtering of only a portion of the total filtered aqueous coffee extract in the conditioning chamber during a conditioning phase, to provide a conditioned, further filtered aqueous coffee extract having dissolved solids and a lesser amount of undissolved solids. In the systems, the conditioning filter may comprise, e.g., a 5 micron filter, or other size, e.g., from about 2 microns to about 8 microns, or larger filter.

The systems may comprise a source of water (e.g., filtered and/or deionized water). The systems may comprise a source of chilled fluid (e.g., glycol, such as ethylene glycol) in fluid communication with the jackets of the brewing chamber and/or the conditioning chamber.

The systems may further comprise a canning line, in fluid communication with the conditioning chamber and with the source of non-oxygen gas containing hydrogen. The canning line may be in fluid communication with a source of liquid nitrogen.

Further provided are cold-brew beverages, prepared by the disclosed methods. The cold-brew beverages prepared by the methods may be packaged in a container (e.g., canned) under oxygen-free, or substantially oxygen-free conditions. The cold-brew beverage within the package may be exposed to a non-oxygen gas mixture comprising hydrogen (e.g., comprising nitrogen and hydrogen, or comprising nitrogen, hydrogen and argon). The hydrogen may comprise about 2% of the non-oxygen gas mixture. The container may be a can or a keg. The cold-brew beverages in the container or vessels may be pressurized with the non-oxygen gas mixture comprising hydrogen. The size of any undissolved solids in the cold-brew beverages may be less than a value in a range of about 2-8 microns, or less than a value of about 5 microns. The shelf-life of the cold-brewed beverage may be a time period selected from the group consisting of: at least 90 days, at least 180 days, at least 270 days, at least 360 days, and greater periods, in each case at a storage temperature value in a range of about 1° C. to about 4.4° C. (about 34° F. to about 40° F.). Alternatively, the shelf-life of the cold-brewed beverage may be, e.g., a time period selected from the group consisting of: at least 90 days, at least 180 days, at least 270 days, at least 360 days, and greater periods, in each case at a storage temperature value in a range of about of about 180° F. (88.2° C.) to any lower temperature above freezing, or to a temperature in any subrange therein.

Also provided are beverages or cold-brew beverages (e.g., in each case prepared by any method) packaged in a container and exposed therein to a non-oxygen gas mixture comprising hydrogen. The non-oxygen gas mixture may, e.g., comprise nitrogen and hydrogen, and including wherein at least a portion of the nitrogen gas derives from liquid nitrogen. The non-oxygen gas mixture may, e.g., comprise nitrogen, hydrogen, and argon. Hydrogen may, e.g., comprise about 2% of the non-oxygen gas mixture. The container may, e.g., be a can or a keg. The beverages or cold-brew beverages in the container or vessels may be pressurized with the non-oxygen gas mixture comprising hydrogen. The size of any undissolved solids in the beverages or cold-brew beverages may be less than a value in a range of about 2-8 microns, or less than a value of about 5 microns. The shelf-life of the beverage or cold-brewed beverage may be a time period selected from the group consisting of: at least 90 days, at least 180 days, at least 270 days, at least 360 days, and greater periods, in each case at a storage temperature value in a range of about 1° C. to about 4.4° C. (about 34° F. to about 40° F.). Alternatively, the shelf-life of the beverage or cold-brewed beverage may be, e.g., a time period selected from the group consisting of: at least 90 days, at least 180 days, at least 270 days, at least 360 days, and greater periods, in each case at a storage temperature value in a range of about of about 180° F. (88.2° C.) to any lower temperature above freezing, or to a temperature in any subrange therein.

The word "may be" in the preceding is not intended to limit the alternatives to the specified examples.

DETAILED DESCRIPTION OF THE INVENTION

Provided are surprisingly effective methods for producing uniform, cold-brew beverages (e.g., coffee, tea, fruit juice/extract, vegetable juice/extract, etc.) having an extended shelf-life, comprising; use of non-oxygen gas mixtures comprising hydrogen for oxygen elimination (to reduce or eliminate total packaged oxygen (TPO)), use of pressure/vacuum ports in brewing and/or conditioning chambers to provide chambered vacuum and/or pressure to enhance oxygen elimination, use of continuous mixing/agitation during the final conditioning phase to provide for even particulate suspension, use of a two-phase filtration system to provide for uniform tailoring of undissolved solid content, and use of jacketed brewing and/or conditioning chambers for enhanced temperature control and uniformity of extraction and conditioning. Also provided are cold-brew beverages prepared by the methods, and systems for making same.

Figure 1:
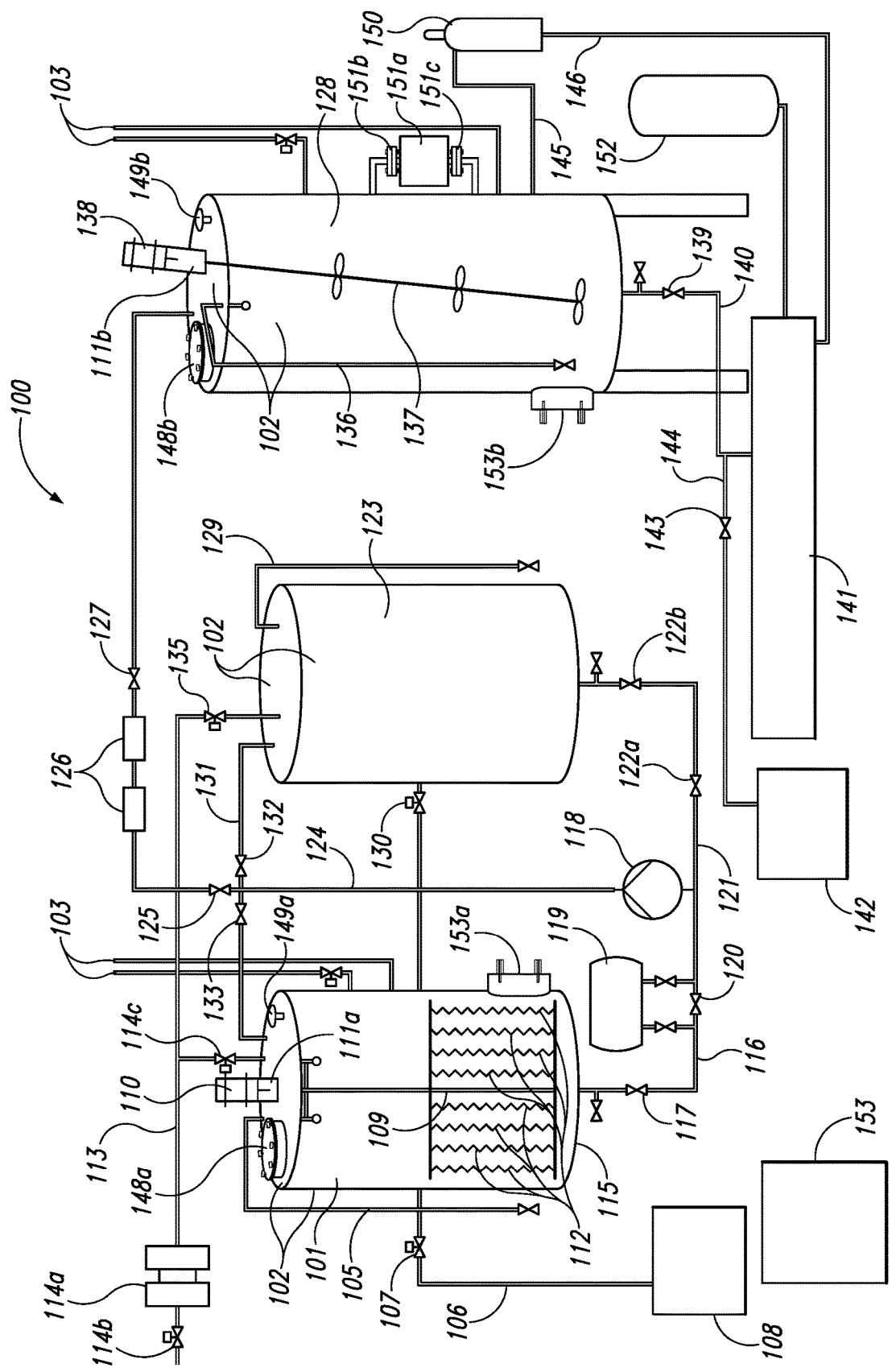
FIG. 1 shows, according to particular aspects, an exemplary embodiment of a production cold-brew coffee brewing system, comprising, inter alia, a jacketed brewing tank/chamber, a jacketed conditioning tank/chamber having a multiphase mixer agitator, and an optional intermediate filtering tank/chamber (e.g., whirlpool-type).

Production Cold-Brewed Coffee Brewing System:

With reference to FIG. 1, a production cold-brewed coffee brewing system 100 is disclosed. The system comprises a brewing tank/chamber 101, having walls 102 (e.g., jacketed walls in fluid communication, via coolant lines 103, with a source of chilled fluid coolant (e.g., chiller for chilling glycol, not shown in FIG. 3). The brewing chamber 101 (in this instance a 15 BBL (465 gallons or 1760 L)) is equipped with a clean-in-place (CIP) system 105 configured to be placed in controlled fluid communication (e.g., via line 106 and valve 107) with a boiler 108 that provides a source of hot water and/or steam, etc., for cleaning the brewing chamber 101 and the interior surfaces of lines/pipes, valves, associated fittings, and other process equipment elements in fluid communication with the brewing chamber 101, without disassembly thereof. The brewing chamber 101 is additionally equipped with an internal mixer 109 (e.g., a multiphase mixer agitator, or other suitable mixer, such as rake mixer, auger mixer(s), burr mixer(s), etc.) driven by an external motor 110 in mechanical communication with the mixer 109 via a gasketed (for air-tight chambering) drive system 111a or shaft through the upper chamber wall 102. In this example, the mixer 109 comprises a rake system 112, but other suitable mixers can be employed, such as one or more auger-type mixer(s), burr mixer(s), etc. The brewing chamber 101 is in fluid communication with a source of water (not shown in FIG. 1) via line 113, in-line filter 114a (e.g., a membrane filter, or other suitable filtering device) and valves 114b and 114c. The brewing chamber 101 is additionally equipped with a filtered false bottom 115. A line 116 with valve 117 is in fluid communication with the bottom of the brewing chamber 101 and provides a path for drawing fluid from the brewing chamber 101 using, for example, a pump 118. Grant tank 119 is in fluid communication with line 116 at two points on either side of valve 120 intermediate between the brewing chamber 101 and pump 118, and serves to ensure that pump 118 does not run dry as the liquid is removed from the brewing chamber 101 and is optionally either (i) pushed to an intermediate filtering chamber 123 (e.g., a whirlpool-type chamber; discussed below) via line 121 and valves 122a and 122b, and/or (ii) pushed directly to a conditioning chamber 128 (discussed below) via line 124, valve 125, in-line filter(s) 126, and valve 127. The brewing chamber 101 additionally comprises a sealable addition port 148a for addition of ingredients (e.g., solids, such as coffee or tea, etc.) into the brewing chamber 101. Flushing of the brewing chamber 101 is typically performed by introducing non-oxygen gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) through a bottom port/line of the brewing chamber 101 and opening a relief valve at the top to allow oxygen-containing gases to be displaced from the brewing chamber 101. Alternatively, gas, or mixtures thereof, can be introduced into the brewing chamber 101 through a controllable pressure/vacuum port 149a for atmospheric chambering, so that a vacuum may be applied, or a gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) may be introduced into the brewing chamber 101 for flushing and/or maintaining gas (including under pressure) in the brewing chamber 101.

The production cold-brewed coffee brewing system 100 comprises an intermediate filtering system between the brewing chamber 101 and the conditioning chamber 128 to filter the aqueous coffee extract to remove a majority portion of the undissolved solids, to provide a filtered aqueous coffee extract having dissolved solids and some undissolved solids. In particular embodiments, the intermediate filtering system is optionally either (i) one or more in-line filter(s) 126, or (ii) an intermediate filtering chamber 123 (e.g., a whirlpool-type chamber). In particular embodiments, liquid removed from the brewing chamber 101 is pushed directly to a conditioning chamber 128 (discussed below) via line 124, valve 125, through in-line filter(s) 126, and valve 127. In certain aspects the in-line filter comprises, e.g., two 60-mesh 229 micron in-line filters, suitable to remove undissolved solids greater than 229 microns, while passing dissolved solids and undissolved solids smaller than 229 microns. Other suitable filter sizes may be used, with the operative principle being removal of a majority weight portion of the undissolved solids when the coffee extract is transferred from the brewing chamber 101 to the conditioning chamber 128. In alternate embodiments, the intermediate filtering system comprises an intermediate filtering chamber 123 (e.g., a whirlpool-type chamber driven by water-in movement; in this instance a 10 BBL (310 gallons or 1173 L)), for removing a majority portion of the undissolved solids, to provide a filtered aqueous coffee extract having dissolved solids and some undissolved solids. In brief, the whirlpool-chamber works by receiving pumped-in liquid through an angled side port, which causes the liquid to swirl/whirlpool inside the chamber. Large/dense particulate is sent via gravity to the center of the whirlpool and caught by a small metal wall at the bottom of the concave floor of the whirlpool chamber, whereas liquid is drained out via a port higher up on the concave whirlpool floor, above where the particular/grounds are caught. Intermediate filtering chamber 123 has chamber walls 102 and is equipped with a CIP system 129 that can be placed in controlled fluid communication with a boiler 108 that provides a source of hot water and/or steam, etc., for cleaning the intermediate filtering chamber 123 and the interior surfaces of lines/pipes, valves, associated fittings, and other process equipment elements in fluid communication with the intermediate filtering chamber 123, without disassembly thereof. Intermediate filtering chamber 123 is in fluid communication with a source of water (not shown in FIG. 1) via line 113, in-line filter 114a (e.g., a membrane filter, or other suitable filtering device) and valves 114b and 135. Intermediate filtering chamber 123 is in controlled fluid communication with the brewing chamber 101 via line 116, valve 117, valve 120, line 121 and valves 122a and 122b. Intermediate filtering chamber 121 is additionally in controlled fluid communication with the boiler 108 via line 106 and valves 107 and 130, and in controlled fluid communication with the brewing chamber 101 via line 131 and valves 132 and 133. The intermediate filtering chamber 123 is further in controlled fluid communication with the conditioning chamber 128 (discussed below) via line 121 and valves 122a and 122b, line 124, valve 125, in-line filter(s) 126, and valve 127. Flushing of the intermediate filtering chamber 123 is typically performed by introducing non-oxygen gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) through a bottom port/line of the intermediate filtering chamber 123 and opening a relief valve at the top to allow oxygen-containing gases to be displaced from the intermediate filtering chamber 123.

The production cold-brewed coffee brewing system 100 additionally comprises a jacketed conditioning chamber 128 (in this instance a 22 BBL (682 gallons or 2582 L)) having walls 102 (e.g., jacketed walls in fluid communication, via coolant lines 103, with a source of chilled fluid coolant (e.g., a chiller for chilling glycol; not shown in FIG. 1). The conditioning chamber 128 is equipped with a clean-in-place (CIP) system 136 that can be placed in controlled fluid communication with a boiler 108 that provides a source of hot water and/or steam, etc., for cleaning the conditioning chamber 128 and the interior surfaces of lines/pipes, valves, associated fittings, and other process equipment elements in fluid communication with the conditioning chamber 128, without disassembly thereof. The conditioning chamber 128 is additionally equipped with an internal mixer 137 (e.g., a multiphase mixer agitator, or other suitable mixer, such as an auger or a burr mixer(s)) driven by an external motor 138 in mechanical communication with the mixer 137 via a gasketed (for air-tight chambering) drive system 111b or shaft through the upper chamber wall 102. A line 140 with valve 139 is in fluid communication with the bottom of the conditioning chamber 128 and provides a path for drawing fluid from the conditioning chamber 128 using, for example, gravity or an optional pump (not shown in FIG. 1), and routing to a canning line 141, or routing to a keg filler 142 via line 144 and valve 143. The conditioning chamber 128, and the canning line 141 are in each case additionally in fluid communication with a first source of gas 150 (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon; preferably nitrogen plus hydrogen) via line 145 (to conditioning chamber 128) and 146 (to canning line 141). In preferred aspects, such gas, or mixtures thereof, are introduced into the conditioning chamber 128 through a controllable pressure/vacuum port 149b for atmospheric chambering, so that gas (e.g., nitrogen, carbon dioxide, hydrogen, argon, liquid nitrogen, etc., or mixtures thereof, such as: nitrogen, and/or liquid nitrogen, plus hydrogen; or nitrogen, and/or liquid nitrogen, plus hydrogen and/or argon; preferably nitrogen plus hydrogen) may be introduced into the conditioning chamber 128 under pressure during the conditioning phase. In particular aspects, such gas is introduced into the conditioning chamber 128 where it is held under pressure within a range of about 20-30 PSI; 22-28 PSI; or 24-26 PSI) during the conditioning phase. As stated above, the production cold-brewed coffee brewing system 100 comprises an intermediate filtering system (either an in-line filter 126, or an intermediate filtering chamber 123) between the brewing chamber 101 and the conditioning chamber 128 to filter the aqueous coffee extract to remove a majority portion of the undissolved solids, to provide a filtered aqueous coffee extract having dissolved solids and some undissolved solids. The conditioning chamber 128 is additionally equipped with a conditioning filtration system 151a (that can be integrated with the conditioning chamber 128 as shown in FIG. 1, or can be a separate mobile system that is attachable to the conditioning chamber 128 via couplers 151b and 151c, which further filters, during a conditioning phase in the conditioning chamber 128, the filtered aqueous coffee received from the in-line filters 126, and/or received from the intermediate filtering chamber 123. The conditioning filtration system 151a (e.g., a 60 mesh 5 micron filter cartridge fit in a suitable bell) filters liquid received from the conditioning chamber 128 and returns the further filtered liquid to the conditioning chamber 128 to remove an additional portion of the undissolved solids, to provide a conditioned, further filtered aqueous coffee extract having dissolved solids and some dissolved solids. The conditioning chamber 128 may optionally additionally comprise a sealable addition port 148b for addition of additives (e.g., conditioning agents) into the conditioning chamber 128.

In preferred aspects, as shown herein, the conditioning filtration system 151a (that can be integrated with the conditioning chamber 128, as shown in FIG. 1, or can be a separate mobile system that is attachable to the conditioning chamber 128 via couplers 151b and 151c, is configured as a continuous lenticular filtration loop (e.g., 5 micron filter; or any value between about 2 an about 8 microns) off of the conditioning chamber 128 adjusted to filter only a portion of the total aqueous coffee solution in the conditioning chamber 128 during the conditioning phase. In combination with the mixing provided by internal mixer 137, which is sufficient to maintain an even or substantially even suspension of dissolved and undissolved solids), the conditioning filtration system 151a thus provides a method to control and adjust the amount and size of undissolved solids (e.g., greater than 5 microns) present in the final conditioned cold-brew product leaving the conditioning chamber 128 after the conditioning phase therein. The chambers and elements of the system 100 are preferably automated and operated, at least in part, using a control panel 153 (e.g., a PLC-based system capable of controlling three motors).

In particular canning aspects, the post-conditioning cold-brew product is canned under pressure (e.g., a pressure in the range of; 30-40 PSI; 32-38 PSI; or 34-36 PSI) with a mixture of gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon). In particular aspects nitrogen and hydrogen are introduced during canning from the first source of gas 150, and nitrogen and argon are introduced during canning from a second source of gas 152. Preferably, liquid nitrogen is also introduced during canning from a source of liquid nitrogen (not shown in FIG. 1). In preferred aspects, nitrogen, liquid nitrogen, hydrogen and argon are introduced during the canning process. Preferably hydrogen is present at about 2% (e.g., hydrogen at 1-5%, 1-4%, 1-3%, or 2-3%). Preferably, argon is present at about 30% (e.g., 25-35%; 28-33%, or 30-31%). Preferably, nitrogen is present at about 70% (e.g., 65-75%, 68-73%, or 70-71%).

Alternate Brewing Chamber Embodiment

Figure 2:
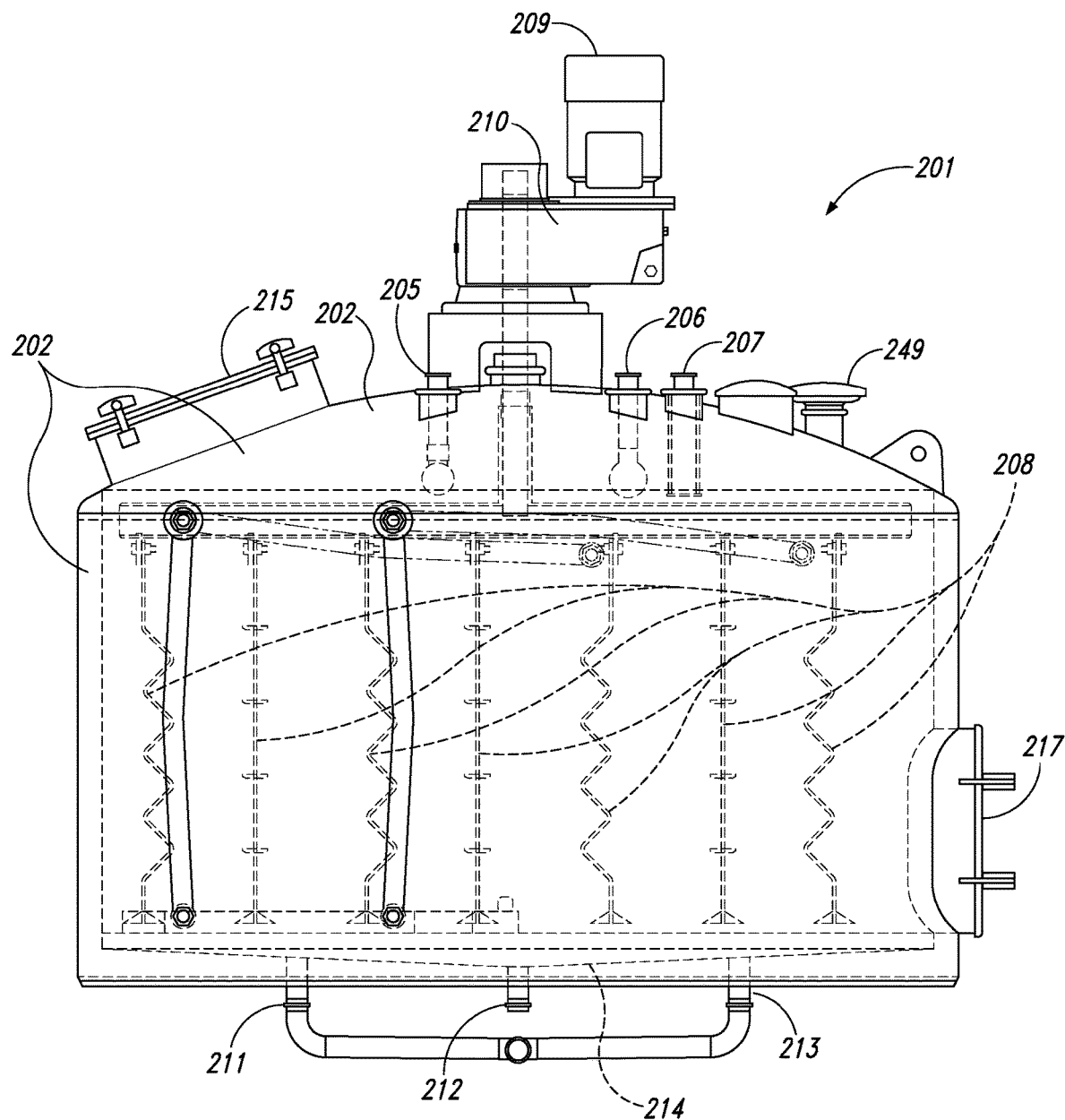
FIG. 2 shows, according to particular aspects, an exemplary embodiment of a jacketed brewing chamber, suitable for use in the production cold-brew coffee brewing system, and having, inter alia, a glycol jacketed walls for temperature control, a pressure/vacuum port for atmospheric chambering, a gasketed (for air-tight chambering) auger mixing system, and motor.

With reference to FIG. 2, an alternate brewing chamber 201 embodiment for the production cold-brewed coffee brewing system 100 is disclosed. The system comprises a brewing chamber 201, having walls 202 (e.g., jacketed walls in fluid communication, via coolant lines (not shown, but similar to 103 shown in FIG. 1) with a source of chilled fluid coolant (e.g., chiller for chilling glycol; not shown). The brewing chamber 201 is equipped with gasketed (for air-tight chambering) CIP nozzles 205, 206 and gasketed water nozzle 207, passing through the upper wall 202. The brewing chamber 201 is additionally equipped with an internal mixer 208, in this instance a rake mixing system (e.g., or suitable multiphase mixer agitator, or other suitable mixer, such as an auger or a burr mixer(s)) driven by an external motor 209 in mechanical communication with the mixer 208 via a gasketed (for air-tight chambering) drive system 210 or shaft through the upper chamber wall 202. The brewing chamber 201 is in fluid communication with a source of water (not shown in FIG. 2) with intermediate in-line filter(s) (e.g., a membrane filters, or other suitable filtering devices as shown in the production cold-brewed coffee brewing system 100 of FIG. 1). The brewing chamber 201 is additionally equipped with a filtered false bottom 214. Port lines 211, 212, and 213 are in fluid communication with the bottom of the brewing chamber 201 and provide a path for drawing fluid from the brewing chamber 201 using, for example, gravity or an optional pump (not shown in FIG. 2). Flushing of the brewing chamber 201 (e.g., prior to brewing) is typically performed by introducing non-oxygen gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) through a bottom port/line (e.g., port line 212) of the brewing chamber 201 and opening a relief valve at the top to allow oxygen-containing gases to be displaced from the brewing chamber 201 (e.g., through controlled pressure/vacuum port 249). The brewing chamber 201 additionally comprises a hinged sealable addition port 215 (here shown at the left on the upper wall 202) for addition of ingredients (e.g., solids, such as coffee or tea, etc.) into the brewing chamber 201. Gas, or mixtures thereof, can be introduced into the brewing chamber 201 through a controllable pressure/vacuum port 249 for atmospheric chambering, so that gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) may be introduced into the brewing chamber 201 for flushing and/or maintaining gas in the brewing chamber 201. The brewing chamber 201 further comprises a hinged access port 217 located in the side wall 202, for accessing and cleaning the interior of the brewing chamber 201. The brewing chamber 201 is configured to be used with a clean-in-place (CIP) system (not shown) in controlled fluid communication with a boiler (not shown) providing a source of hot water and/or steam, etc., for cleaning the brewing chamber 201 and the interior surfaces of lines/pipes, valves, associated fittings, and other process equipment elements in fluid communication with the brewing chamber 201, without disassembly thereof.

The brewing chamber 201 can be integrated into the production cold-brewed coffee brewing system 100 of FIG. 1, in place of brewing chamber 101, and communicates with the optional intermediate filtering chamber 123 (e.g., a whirlpool-type chamber) and/or with the jacketed conditioning chamber 128 as described above for the production cold-brewed coffee brewing system 100 of FIG. 1.

Alternate Conditioning Chamber Embodiment

Figure 3:
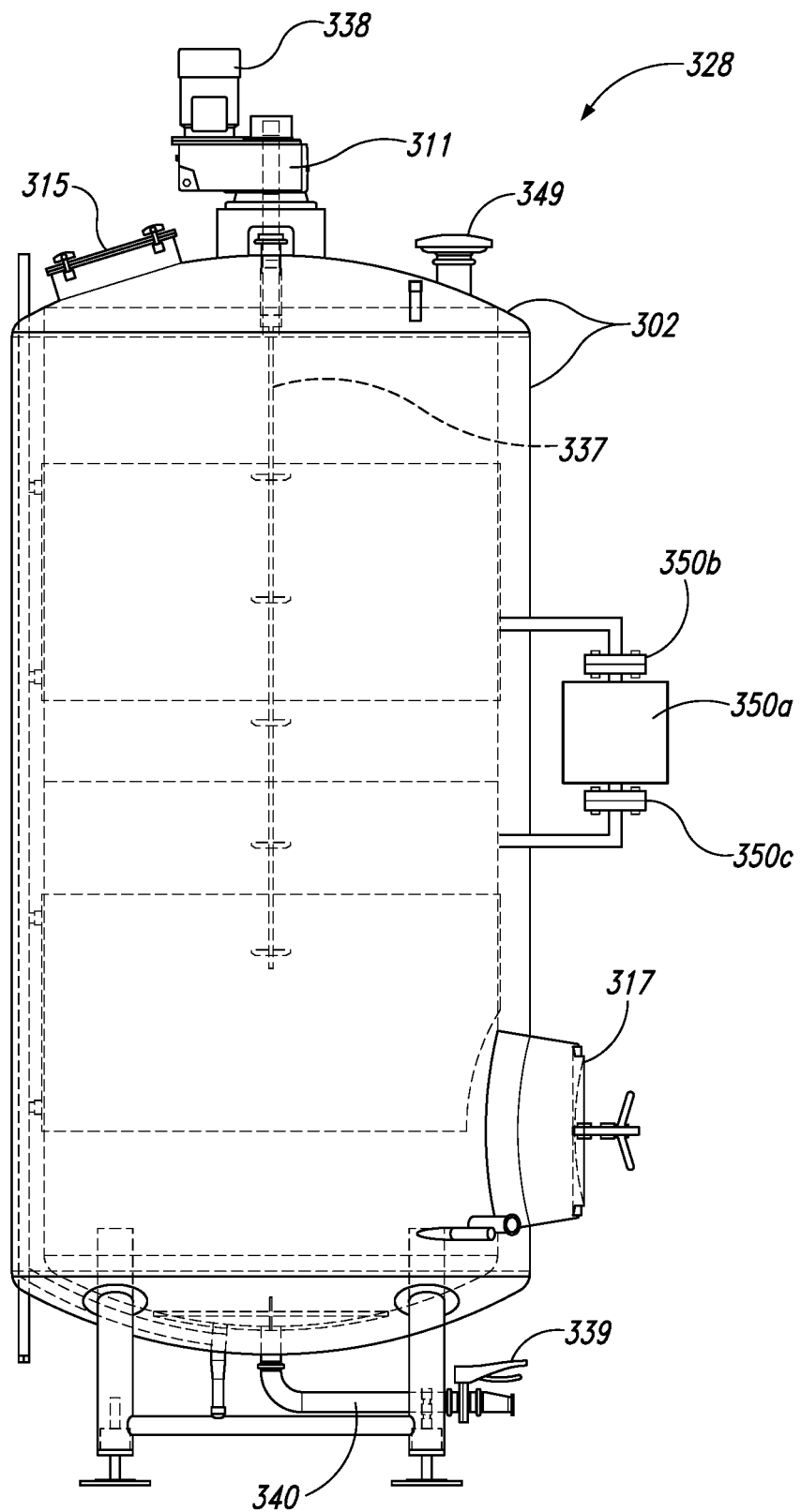
FIG. 3 shows, according to particular aspects, an exemplary embodiment of a jacketed conditioning chamber suitable for use in the production cold-brew coffee brewing system, and having, inter alia, glycol jacketed walls for temperature control, a pressure/vacuum port for atmospheric chambering (similar to the pressure/vacuum port shown in FIG. 2), a gasketed (for air-tight chambering) burr auger mixer system, and motor.

With reference to FIG. 3, an alternate conditioning chamber 328 embodiment for the production cold-brewed coffee brewing system 100 is disclosed. The system comprises a jacketed conditioning chamber 328 having walls 302 (e.g., jacketed walls in fluid communication, via coolant lines (not shown, but similar to 103 shown in FIG. 1), with a source of chilled fluid coolant (e.g., a chiller for chilling glycol, not shown in FIG. 3). The conditioning chamber 328 is equipped with a clean-in-place (CIP) system (not shown in FIG. 3) that can be placed in controlled fluid communication with a boiler (not shown) that provides a source of hot water and/or steam, etc., for cleaning the conditioning chamber 328 and the interior surfaces of lines/pipes, valves, associated fittings, and other process equipment elements in fluid communication with the conditioning chamber 328, without disassembly thereof. The conditioning chamber 328 is additionally equipped with an internal mixer 337 (e.g., a multiphase mixer agitator, or other suitable mixer, such as an auger or a burr mixer(s)) driven by an external motor 338 in mechanical communication with the mixer 337 via a gasketed (for air-tight chambering) drive system 311 or shaft through the upper chamber wall 302. A line 340 with valve 339 is in fluid communication with the bottom of the conditioning chamber 328 and provides a path for drawing fluid from the conditioning chamber 328 using, for example, gravity or an optional pump (not shown in FIG. 3), or routing to a canning line (now shown), or routing to a keg filler (not shown) via additional line(s) and valve(s). In analogy to the conditioning chamber embodiment of the system 100 of FIG. 1, The conditioning chamber 328, and the canning line are in each case additionally in fluid communication with a first source of gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon; preferably nitrogen plus hydrogen. In preferred aspects, such gas, or mixtures thereof, are introduced into the conditioning chamber 328 through a controllable pressure/vacuum port 349 (similar to the controllable pressure/vacuum port 249 of FIG. 2), for atmospheric chambering, so that gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon; preferably nitrogen plus hydrogen) may be introduced into the conditioning chamber 328 under pressure during the conditioning phase. In particular aspects, such gas is introduced into the conditioning chamber 328 where it is held under pressure within a range of about 20-30 PSI; 22-28 PSI; or 24-26 PSI) during the conditioning phase. The conditioning chamber 328 further comprises a hinged access port 317 located in the side wall 302, for accessing and cleaning the interior of the conditioning chamber 328. The conditioning chamber 328 may optionally additionally comprise a sealable addition port 315 (similar to the sealable addition port 215 of FIG. 2) for addition of additives (e.g., conditioning agents) into the conditioning chamber 128. The conditioning chamber 328 is additionally equipped with a conditioning filtration system 350a (e.g., a lenticular filter system that can either be integrated with the conditioning chamber 328, or can be a separate mobile system that is attachable to the conditioning chamber 328) via couplers 350b and 350c, which further filters, during a conditioning phase in the conditioning chamber 328, the filtered aqueous coffee received, from (with reference to FIG. 1) the in-line filters 126, and/or received from the intermediate filtering chamber 123. The conditioning filtration system 350a filters liquid received from the conditioning chamber 328 and returns the further filtered liquid to the conditioning chamber 328 to remove an additional portion of the undissolved solids, to provide a conditioned, further filtered aqueous coffee extract having dissolved solids and some dissolved solids. In preferred aspects, as shown herein, the conditioning filtration system 350 is configured as a continuous lenticular filtration loop (e.g., 5 micron filter; or, e.g., any size between about 2 micron and about 8 microns) off of the conditioning chamber 328 adjusted to filter only a portion of the total aqueous coffee solution in the conditioning chamber 328 during the conditioning phase. In combination with the mixing provided by internal mixer 337, which is sufficient to maintain an even or substantially even suspension of dissolved and undissolved solids), the conditioning filtration system 350 thus provides a method to control and adjust the amount and size of undissolved solids (e.g., greater than, e.g., 5 microns) present in the final conditioned cold-brew product leaving the conditioning chamber 128 after the conditioning phase therein.

The conditioning chamber 328 can be integrated into the production cold-brewed coffee brewing system 100 of FIG. 1, in place of conditioning chamber 128, and communicates with the optional intermediate filtering chamber 123 (e.g., a whirlpool-type chamber) and/or directly with the jacketed brewing chamber 101 (or the alternate brewing chamber 201 of FIG. 2) via in-line filter(s) 126 and line 124, as described above for the production cold-brewed coffee brewing system 100 of FIG. 1.

Method of Production of Cold-Brewed Coffee:

In particular aspects, cold-brewed beverages (e.g., coffee, tea) are produced by the exemplary system 100 shown in FIG. 1 (and also with reference to FIGS. 2 and 3).

Coffee, for example, can be roasted to any desired degree (e.g., light, medium or dark, etc.) under various temperature (e.g., about 200° F. to about 530° F.; or about 93.3° C. to about 277° C.), times, and gas environments, and broken up (e.g., ground) to any desired degree (e.g., into particles having a size in the range of about 100 microns to about 1,000 microns. In particular aspects, a Loring™ roaster is used (using roughly 75% less natural gas usage than a traditional roaster WITH an afterburner), and the coffee is ground using a Mahlkonig™ DK15 LH set at a grind setting of "6."

The brewing chamber 101 (or 201, if the brewing chamber of FIG. 2 is used) is purged with a non-oxygen gas or gas mixture (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon). Water (e.g., reverse osmosis, deionized or filtered through a membrane filter, or other suitable filtering device) is the added to the brewing chamber 101, coffee or pieces of coffee (e.g., ground coffee) is added through the addition port 148a, and the internal mixer 109 (or 208, if the brewing chamber of FIG. 2 is used) is activated (e.g., 24 Hz) for at least a portion (e.g., 2-4 hours) of a brewing period/phase (e.g., about 12-20 hours; about 14-16 hours) to provide a coffee extract having dissolved and undissolved solids.

After the brewing period/phase, and with reference to FIG. 1, the coffee extract is subjected to a first filtering phase to remove the majority of undissolved solids, by transferring (e.g., by gravity and/or pump) to either (i) an intermediate filtering chamber 123 (e.g., a whirlpool-type chamber), and/or (ii) through in-line filter(s) 126 (e.g., dual 60-mesh, 229 micron filters).

After the first filtering phase, the filtered coffee extract is transferred to a conditioning chamber 128 (or 328, if the conditioning chamber of FIG. 3 is used) pre-flushed with a non-oxygen gas or gas mixture (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) to remove oxygen from the chamber, and an internal mixer 137 (or 337, if the conditioning chamber of FIG. 2 is used), sufficient to maintain an even or substantially even suspension of dissolved and undissolved solids, is activated. The filtered coffee in the conditioning chamber 128 is then further filtered using a conditioning filtration system 151a (that can be integrated with the conditioning chamber 128 as shown in FIG. 1, or can be a separate mobile system that is attachable to the conditioning chamber 128 via couplers 151b and 151c (or 350 if the conditioning chamber of FIG. 3 is used; and which can likewise be integral or mobile and attachable) to further filter the phase-1 filtered aqueous coffee to remove an additional portion of the undissolved solids, to provide a conditioned, further filtered aqueous coffee extract having dissolved solids and some dissolved solids. Preferably, the conditioning filtration system 350a is configured as a continuous lenticular filtration loop (e.g., 5 micron filter) off of the conditioning chamber 128 (or 328 if the conditioning chamber of FIG. 3 is used) and activated for a time period sufficient to filter only a portion of the total aqueous coffee solution in the conditioning chamber 328 during an initial portion of the conditioning phase (e.g., 1-4 hours, 1.5-2.5 hours, 2-2.5 hours) and then deactivated.

With continuing mixing by the internal mixer 137, a non-oxygen gas or gas mixture (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon) is then added (e.g., via a carb-stone system) to bring the conditioning chamber 128 (or 328 if the conditioning chamber of FIG. 3 is used) to about 20 psi pressure for a period of about 24 hr, or other suitable period to ensure that oxygen is eliminated from the conditioned filtered conditioned coffee extract (e.g., 5-40 hours, 10-30 hours, 15-25 hours, 20-24 hours). Preferably, a mixture of nitrogen plus hydrogen (e.g., hydrogen at 1-5%, 1-4%, 1-3%, or 2-3%) is used at a pressure within a range of about 20-30 PSI; 22-28 PSI; or 24-26 PSI) during the remainder of the conditioning phase.

The post-conditioning cold-brew product is then packaged (e.g., canned) under pressure (e.g., a pressure in the range of: 30-40 PSI; 32-38 PSI; or 34-36 PSI) with a mixture of gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon). In particular aspects nitrogen and hydrogen are introduced during canning from the first source of gas 150, and nitrogen and argon are introduced during canning from a second source of gas 152. Preferably, liquid nitrogen is also introduced during canning from a source of liquid nitrogen (not shown in FIG. 1). In preferred aspects, nitrogen, liquid nitrogen, hydrogen and argon are introduced during canning. Preferably hydrogen is present at about 2%. Preferably, argon is present at about 30% (e.g., 25-35%; 28-33%; or 30-31%).

Optionally, a food-safe preservative, such as antioxidant and/or antibacterial agents (e.g., ascorbic acid, sodium ascorbate, citric acid, sodium citrate, tocopherols, lactic acid, sorbic acid, sodium sorbate, propionic acid, sodium propionate, sulfur dioxide, sulfites (e.g., calcium hydrogen sulfite, calcium metabisulfite, calcium sulfite, potassium hydrogen sulfite, potassium metabisulfite, potassium sulfite, sodium hydrogen sulfite, sodium metabisulfite, sodium sulfite, sodium thiosulfate, and sulfur dioxide, etc., in each case in an amount, e.g., in a range of about 0.025 mM to about 0.250 mM; about 0.050 mM to about 0.200 mM; about 0.075 mM to about 0.150 mM; or about 0.075 mM to about 0.100 mM) can be added to the conditioned cold-brew product prior to packaging, to further preclude oxidation and/or bacterial growth.

Optionally, high pressure processing (HPP), comprising cold pasteurization processes, under which products are subjected to a high level of isostatic pressure (300-600 Mpa; 43,500-87,000 psi) (e.g., transmitted by water) may be used to treat the conditioned cold-brew product prior to packaging, to further preclude bacterial growth.

Optionally, a flavor and/or nutrient modifier (e.g., milk (e.g., cow, sheep, goat, etc.), soy milk, coconut milk, almond milk, oat milk, cashew milk, etc.) can be added to the coffee extract prior to packaging (e.g., canning). Preferably, such additives are pasteurized or sterilized prior to addition thereof to the coffee extract.

Optionally, trace minerals can be added as some point during the brewing or conditioning process to enhance organoleptic qualities.

In addition to the use of pressure, mixing of the filtered or further filtered aqueous coffee extract in the conditioning chamber during the conditioning phase, or during storage of the packaged cold-brew product in the packaging container (e.g., can), may optionally take place in the presence (including under pressure) of a catalyst of the 4-electron reaction between hydrogen and oxygen gases (2 $H_2$+O2+ 2$H_2$O). For example, exposure to platinum metal, or the use of such agents as iridium-based transfer hydrogenation catalysts and the like may be employed.

According to particular aspects, the use of continuous mixing during the conditioning phase is contraindicated by the prior art, which does not use such mixing in order to reduce solid particulate matter (e.g., by allowing gravity separation), and to not degrade the benefits of the gasification/carb-stoning phase (by not facilitating off-gassing).

According to additional aspects, the use of hydrogen gas, and including nitrogen plus hydrogen gas, has not been used in the prior art, and particularly exposure to non-oxygen gas(es) comprising hydrogen (e.g., nitrogen gas plus hydrogen gas; or nitrogen gas plus argon gas plus hydrogen gas) under pressure, as disclosed herein, and optionally in the presence of a catalyst (including under pressure), provides a way to eliminate or substantially eliminate any residual oxygen in the final conditioned filtered coffee extract.

According to further aspects, the conditioning filtration system 350a in combination with the mixing provided by internal mixer 337, which is sufficient to maintain an even or substantially even suspension of dissolved and undissolved solids), provides a method to control and adjust the amount and size of undissolved solids (e.g., greater than 5 microns) present in the final conditioned cold-brew product leaving the conditioning chamber 128 (or 328 if the conditioning chamber of FIG. 3 is used) after the conditioning phase therein. The introduction of a multiphase agitation mixer allows a specific particulate to remain evenly suspended in tank to prevent variation in total dissolved solids (TDS) as well as allowing ingredients that would otherwise be unable to be maintained in liquid mixture (oils or alcohols) without an emulsifier to stay evenly blended for packaging.

According to yet further aspects, packaging under hydrogen gas, and including nitrogen plus hydrogen gas (and preferably under a combination of nitrogen, liquid nitrogen, hydrogen and argon) has not been used in the prior art, and provides a way to not only eliminate or substantially eliminate any residual oxygen in the final conditioned filtered coffee extract, but to substantially extend shelf-life (e.g., to a year or more under refrigeration conditions, e.g., at a storage temperature value in a range of about 1° C. to about 4.4° C. (about 34° F. to about 40° F.) of the product relative to prior art methods that typically provide for at most about 60-90 days under refrigeration.

According to yet further aspects, packaging under hydrogen gas as described above, in combination with use of one or more food-safe preservatives, such as antioxidant and/or antibacterial agents as described herein, has not been used in the prior art.

According to particular aspects, use of glycol jacketed brew chambers, including in combination with jacketed conditioning chambers, optionally in each case with pressure/vacuum capability has not been described in the prior art for cold-brewing processes.

In further aspects, while the exemplary working examples herein are drawn to cold-brewed coffee, the disclosed cold-brew methods can be applied to essentially any extractable (e.g., aqueous-extractable) material (e.g., coffee, tea, fruit and/or vegetable extracts, herbs, grains, rhizomes, tubers, etc.) to improve the batch-to-batch uniformity (e.g., where the extracted beverage product typically contains both dissolved and undissolved solids), and the organoleptic (e.g., flavor, texture, aroma, color/appearance, feel, etc.), nutritive (e.g., vitamins, nutrients, etc.), and stability (e.g., extended shelf-life) properties of the cold-extracted beverages (e.g., beverages traditionally subject to hot-brew processes that degrade organoleptic and nutritive qualities).

Terms (Definitions)

Unless otherwise explained, all technical and scientific terms used herein have the same meaning as commonly understood by one of ordinary skill in the art to which this disclosure belongs.

The singular terms "a," "an," and "the" include plural referents unless context clearly indicates otherwise. Similarly, the word "or" is intended to include "and" unless the context clearly indicates otherwise.

Although methods and materials similar or equivalent to those described herein can be used in the practice or testing of this disclosure, suitable methods and materials are described below. The term "comprises" means "includes." The abbreviation, "e.g." is derived from the Latin exempli gratis, and is used herein to indicate a non-limiting example. Thus, the abbreviation "e.g." is synonymous with the term "for example."

In order to facilitate review of the various embodiments of this disclosure, the following explanations of specific terms are provided:

The term "about" when used before a numerical value indicates that the value may vary within a reasonable range, such as ±5%, ±1%, and ±0.2%.

The term "total dissolved solids," as referred to herein, refers to all inorganic and organic substances contained in a liquid in molecular, ionized or micro-granular (colloidal sol) suspended form up to 5 microns.

The term "beverage quality" or "retaining beverage quality," as referred to herein includes, but is not limited to, at least one of flavor, color, texture, aroma or nutrients, and vitamins.

The term "food grade" with respect to methods and procedures employed in cold-brew production methods refers to the art recognized food grade certification governed by the department of agriculture, NSF and the FDA.

An "antioxidant" is an agent that is added to prevent oxidation of the subject oils. Food-grade antioxidants are preferred in the disclosed methods. For example, Vitamin E (e.g., 500 ppm) as mixed tocopherols may be added to protect the product from the ravages of oxidation during later storage. Many other food-grade antioxidants are known in the art and include, for example, ethoxyquin, butylated hydroxyanisole (BHA), butylated hydroxytoluene (BHT), tertiary butylhydroquinone (TBHQ), and propyl gallate.

A "preservative" is an agent that is added to a composition to prevent decomposition due to chemical change or microbial action. In the context of beverage compositions, a preservative may be added to prevent microbial (e.g., bacterial and fungal) growth. Exemplary food-safe preservatives, such as antioxidant and/or antibacterial agents, include, but are not limited to ascorbic acid, sodium ascorbate, citric acid, sodium citrate, tocopherols, lactic acid, sorbic acid, sodium sorbate, propionic acid, sodium propionate, sulfur dioxide, sulfites (e.g., calcium hydrogen sulfite, calcium metabisulfite, calcium sulfite, potassium hydrogen sulfite, potassium metabisulfite, potassium sulfite, sodium hydrogen sulfite, sodium metabisulfite, sodium sulfite, sodium thiosulfate, and sulfur dioxide, etc., which can be added alone or in combinations to conditioned cold-brew product prior to packaging, to further preclude oxidation and/or ensure against bacterial growth.

The term "preservative-free" indicates that no preservative is added to the composition.

In the context of this disclosure "room temperature" refers to any temperature within a range of temperatures between about 16° C. (approximately 61° F.) and about 25° C. (approximately 77° F.). Commonly, room temperature is between about 20° C. and 22° C. (68° F.-72° F.). Generally, the term room temperature is used to indicate that no additional energy is expended cooling (e.g., refrigerating) or heating the sample or ambient temperature.

The phrase "suitable cold brew temperature" as used herein, means broadly any temperature below the recognized pasteurization temperature for the material being brewed. In particular aspects herein, "suitable cold brew temperature" refers to a temperature(s) in a range of about 180° F. (88.2° C.) to any lower temperature above freezing, or to any subrange therein. In preferred aspects, "suitable cold brew temperature" refers to a temperature(s) in a range of about ambient temperature to any lower temperature above freezing, or any subrange therein. In more preferred aspects, "suitable cold brew temperature" refers to a temperature of about 7° C. (approx. 45° F.).

The phrase "Good Manufacturing Practice" or "GMP" with respect to methods and procedures employed in food production refer specifically to the set of methods, protocols and procedures established by the United States Food and Drug Administration (FDA). Similar recommendations and guidelines are promulgated by the World Health Organization. The abbreviation "cGMP" specifically designates those protocols and procedures that are currently approved by the FDA (e.g., under 21 Code of Federal Regulations, parts 210 and 211, available on the world wide web at fda.gov/cder/dmpq). With time cGMP compliant procedures may change. Any methods disclosed herein can be adapted in accordance with new cGMP requirements as mandated by the FDA.

Example 1

Production Cold-Brew Coffee Method was Used to Generate Cold-Brew Coffee

This example describes an exemplary scheduling embodiment of the disclosed cold-brew coffee production method to generate highly uniform cold-brew coffee having an extended shelf-life. The chronology of events are keyed to "brew time," which is the time of initiation of the brewing phase of the process (in this instance a 16-17 hours brewing phase).

With reference to the system 100 of FIG. 1, coffee was ground coffee (in this instance roasted coffee beans) approximately 1 hour prior to brew time (e.g., using a Mahlkonig DK15 LH; grind setting at, e.g., "6"), and at approx. 40 minutes prior to brew time, the brewing chamber 101 was sanitized (e.g., steam) and then flushed with non-oxygen gas (e.g., nitrogen plus hydrogen), followed by addition of filtered water to the brewing chamber 101 at about 15 mins prior to brew time. The intermediate filtering chamber 123 was sanitized just prior to use, as discussed below. At brew time, the coffee (e.g., ground coffee) was added (through sealable addition port 148a) to the water in the brewing chamber 101 and mechanized agitation (internal mixer 109) was activated (e.g., approx. 24 Hz). At about 45 mins from (after) brew time the status of the conditioning chamber 128 as cleaned and ready for sanitation was confirmed. At approx. 2 hours from brew time, the mechanized agitation (internal mixer 109) was turned off. At approx. 14 hours from brew time, the mechanized agitation (internal mixer 109) was re-activated (e.g., approx. 24 Hz). At approx. 16 hours from brew time, the mechanized agitation (internal mixer 109) was turned off, the conditioning chamber 128 was sanitized and flushed/purged with non-oxygen gas (e.g., nitrogen and hydrogen), and the lenticular filter (conditioning filtration system 151a) of the conditioning chamber 128 was sanitized. At approx. 16.5 hours from brew time, the process piping to the intermediate filtering chamber 123 (whirlpool-type) was opened, and sending coffee extract from the brewing chamber 101 to the intermediate filtering chamber 123 was initiated, with portions of filtered coffee extract being sent from the intermediate filtering chamber 123 to the conditioning chamber 128 at 15 min. intervals, until the coffee extract in the brewing chamber 101 has been filtered and transferred to the conditioning chamber 128 (typically, the transfer of the filtered coffee extract to the conditioning chamber 128 is complete by about 17 hours from brew time), after which time the internal mixer 137 is activated, followed by activation of the lenticular filter (conditioning filtration system 151a; in this instance dual 60-mesh, 5 micron filters driven by a mobile pump at 45 hz) of the conditioning chamber 128. At approx. 17 hours from brew time, the intermediate filtering chamber 123 (whirlpool-type) was cleaned and the clean-in-place (CIP) process was initiated to clean the intermediate filtering chamber 123 and associated fixtures, pipes, valves, etc. At approx. 17.5 hours from brew time, the brewing chamber 101 was cleaned and the clean-in-place (CIP) process was initiated to clean the brewing chamber 101 and associated fixtures, pipes, valves, etc. Also at approx. 17.5 hours from brew time, the lenticular filter (conditioning filtration system 151a) of the conditioning chamber 128 was turned off, having filtered for a time (here 0.5 hour) sufficient to further filter only a portion (approx. ⅔ of the total volume) of the total volume of filtered coffee extract received into the conditioning chamber 128), and water conditioning components (trace minerals, and optionally, a food-safe preservative, such as antioxidant and/or antibacterial agents) were added to the further filtered coffee extract. The further filtered coffee extract was then purged, via carb stone, with a mixture of nitrogen and hydrogen (typically, about 2% hydrogen), and the conditioning chamber 128 was brought to about 20 psi with the mixture of nitrogen and hydrogen gas, with continuing mixing by internal mixer 137 to provide for exposure of the further filtered coffee extract to the pressurized nitrogen plus hydrogen gas for a time period (in this instance 1-day) sufficient to ensure that oxygen is eliminated from the conditioned further filtered coffee extract (e.g., 5-40 hours, 10-30 hours, 15-25 hours, 20-24 hours), to provide a conditioned further filtered coffee extract having no, or substantially no oxygen.

The conditioned further filtered coffee extract was then routed, with reference to FIG. 1, to a canning line 141, or routing to a keg filler 142 for packaging. In brief, in this instance, the conditioned further filtered coffee extract was canned under pressure (e.g., a pressure in the range of; 30-40 PSI; 32-38 PSI; or 34-36 PSI) with a mixture of gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon). In this instance and with reference to FIG. 1, nitrogen and hydrogen were introduced during canning from a first source of gas 150, and nitrogen and argon were introduced during canning from a second source of gas 152. In this instance, liquid nitrogen (e.g., about 0.22 g per can (about 12.2 oz; or about 6.45 ml)) was also introduced during canning. In this instance, therefore, nitrogen (e.g., about 70% (e.g., 65-75%, 68-73%, or 70-71%)), liquid nitrogen (e.g., about 0.22 g/can (about 12.2 oz; or about 6.45 ml)), hydrogen (about 2% (e.g., hydrogen at 1-5%, 1-4%, 1-3%, or 2-3%)) and argon (about 30% (e.g., 25-35%; 28-33%, or 30-31%)) were introduced during canning, to provide a canned cold-brewed coffee product having a shelf life of approx. 1-year or longer at refrigeration temperatures (e.g., at a storage temperature value in a range of about 1° C. to about 4.4° C. (about 34° F. to about 40° F.)).

Example 2

Production Cold-Brew Coffee Method was Used to Generate Cold-Brew Coffee

This example describes an additional exemplary scheduling embodiment of the disclosed cold-brew coffee production method to generate highly uniform cold-brew coffee having an extended shelf-life. The chronology of events are keyed to "brew time," which is the time of initiation of the brewing phase of the process (in this instance a 16-17 hours brewing phase).

With reference to FIGS. 2 and 3, and to the system 100 of FIG. 1, coffee (in this instance roasted coffee beans) was ground approximately 1 day prior to brew time (e.g., using a Mahlkonig DK15 LH; grind setting at, e.g., "6") and immediately placed under vacuum to reduce or eliminate exposure to oxygen), and at approx. 40 minutes prior to brew time, the brewing chamber 201 was sanitized (e.g., steam) and then, at approx. 20 minutes prior to brew time, flushed/purged with non-oxygen gas (e.g., nitrogen plus hydrogen), followed by addition of filtered water to the brewing chamber 201 at about 15 mins prior to brew time. At brew time, the ground coffee was added (through hinged sealable addition port 215) to the water in the brewing chamber 201 and mechanized agitation (internal mixer 208) was activated (e.g., approx. 24 Hz), and an optional vacuum applied to the brewing chamber 201. At about 45 mins from (after) brew time the status of the jacketed conditioning chamber 328 as cleaned and ready for sanitation was confirmed. At approx. 2 hours from brew time, the mechanized agitation (internal mixer 208) was turned off. At approx. 14 hours from brew time, the mechanized agitation (internal mixer 208) was re-activated (e.g., approx. 24 Hz). At approx. 16 hours from brew time, the mechanized agitation (internal mixer 208) was turned off, the jacketed conditioning chamber 328 was sanitized and flushed/purged with non-oxygen gas (e.g., nitrogen and hydrogen), and the lenticular filter (conditioning filtration system 350a) of the conditioning chamber 328 was sanitized. At approx. 16.5 hours from brew time, the process piping to in-line filter(s) 126 (e.g., dual 60-mesh, 229 micron filters) was opened, and the coffee extract directed from the brewing chamber 201 to the conditioning chamber 328 via the in-line filter(s) 126, until the coffee extract in the brewing chamber 201 was filtered and transferred to the conditioning chamber 328. Typically, the transfer of the filtered coffee extract to the conditioning chamber 328 is complete by about 17 hours from brew time), after which time the internal mixer 337 is activated, followed by activation of the conditioning filtration system 350a (in this instance configured as a continuous lenticular filtration loop (5 micron filter) driven by a mobile pump at 45 hz) off of the conditioning chamber 328 adjusted to filter only a portion of the total aqueous coffee solution in the conditioning chamber 328 during the conditioning phase. At approx. 17 hours from brew time, the in-line filter(s) 126 was cleaned and the clean-in-place (CIP) process was initiated to clean the in-line filter(s) 126 and associated fixtures, pipes, valves, etc. At approx. 17.5 hours from brew time, the brewing chamber 201 was cleaned and the clean-in-place (CIP) process was initiated to clean the brewing chamber 201 and associated fixtures, pipes, valves, etc. Also at approx. 17.5 hours from brew time, the conditioning filtration system 350a of the conditioning chamber 328 was turned off (after having been run at a rate and for a time (here 0.5 hour) sufficient to further filter only a portion (approx. ⅔ of the total volume) of the total volume of filtered coffee extract received into the conditioning chamber 328), and water conditioning components (trace minerals, and optionally, a food-safe preservative, such as antioxidant and/or antibacterial agents) were added to the further filtered coffee extract. The further filtered coffee extract was then purged, via carb stone, with a mixture of nitrogen and hydrogen (typically, about 2% hydrogen), and the conditioning chamber 328 was brought to about 20 psi with the mixture of nitrogen and hydrogen gas, with continuing mixing by internal mixer 337 to provide for exposure of the further filtered coffee extract to the pressurized nitrogen plus hydrogen gas for a time period (in this instance 1-day) sufficient to ensure that oxygen is eliminated from the conditioned further filtered coffee extract (e.g., 5-40 hours, 10-30 hours, 15-25 hours, 20-24 hours), to provide a conditioned further filtered coffee extract having no, or substantially no oxygen.

The conditioned further filtered coffee extract was then routed, with reference to FIG. 1, to a canning line 141, or routing to a keg filler 142 for packaging. In brief, in this instance, the conditioned further filtered coffee extract was canned under pressure (e.g., a pressure in the range of; 30-40 PSI; 32-38 PSI; or 34-36 PSI) with a mixture of gas (e.g., nitrogen, carbon dioxide, hydrogen, argon, liquid nitrogen etc., or mixtures thereof, such as: nitrogen, and/or liquid nitrogen, plus hydrogen; or nitrogen, and/or liquid nitrogen, plus hydrogen and/or argon). In this instance and with reference to FIG. 1, nitrogen and hydrogen were introduced during canning from a first source of gas 150, and nitrogen and argon were introduced during canning from a second source of gas 152. In this instance, liquid nitrogen (e.g., about 0.22 g/can (about 12.2 oz; or about 6.45 ml) was also introduced during canning. In this instance, therefore, nitrogen (e.g., about 70% (e.g., 65-75%, 68-73%, or 70-71%)), liquid nitrogen (e.g., about 0.22 g/can (about 12.2 oz; or about 6.45 ml)), hydrogen (about 2% (e.g., hydrogen at 1-5%, 1-4%, 1-3%, or 2-3%)) and argon (about 30% (e.g., 25-35%; 28-33%, or 30-31%)) were introduced during canning, to provide a canned cold-brewed coffee product having a shelf life of approx. 1-year or longer at refrigeration temperatures (e.g., at a storage temperature value in a range of about 1° C. to about 4.4° C. (about 34° F. to about 40° F.)).

The invention claimed is:

1. A method for making a uniform cold-brewed beverage having reproducible organoleptic and nutritional qualities, with extended shelf-life, comprising:
   mixing, with agitation in a brewing chamber, coffee with an aqueous medium at a suitable cold brew temperature and for a time sufficient to extract the coffee, to provide an aqueous coffee extract having dissolved and undissolved solids;
   filtering, the aqueous coffee extract to remove a majority portion of the undissolved solids, to provide a filtered aqueous coffee extract having dissolved solids and some undissolved solids;
   purging a conditioning chamber with non-oxygen gas comprising hydrogen to provide a purged conditioning chamber; and
   mixing, the filtered aqueous coffee extract in the purged conditioning chamber in the presence of the non-oxygen gas comprising hydrogen, using agitation sufficient to maintain an even or substantially even suspension of dissolved and undissolved solids, at a temperature and for a time sufficient to reduce or substantially eliminate any residual oxygen present in the filtered aqueous coffee extract, to provide a conditioned filtered aqueous coffee extract having dissolved and undissolved solids, and having an enhanced stability or shelf-life relative to a coffee extract made by use, in the method, of the non-oxygen gas without hydrogen.

2. The method of claim 1, wherein, prior to mixing the coffee with the aqueous medium, the brewing chamber is purged with the non-oxygen gas comprising hydrogen to provide a purged brewing chamber.

3. The method of claim 1, wherein mixing, with agitation in the brewing chamber, coffee with the aqueous medium comprises mixing with agitation at a temperature in a range of about 1801° F. to any lower temperature above freezing, or to a temperature in any subrange therein.

4. The method of claim 3, wherein mixing, with agitation in the brewing chamber, coffee with the aqueous medium comprises mixing with agitation at a temperature in a range of about ambient temperature to any lower temperature above freezing, or to a temperature in any subrange therein.

5. The method of claim 4, wherein mixing, with agitation in the brewing chamber, coffee with the aqueous medium comprises mixing with agitation at a temperature of about 45° F.

6. The method of claim 1, wherein mixing the filtered aqueous coffee extract in the purged conditioning chamber in the presence of the non-oxygen gas comprising hydrogen comprises mixing at a temperature in a range of about 180° F. to any lower temperature above freezing, or to a temperature in any subrange therein.

7. The method of claim 6, wherein mixing the filtered aqueous coffee extract in the purged conditioning chamber in the presence of the non-oxygen gas comprising hydrogen comprises mixing at a temperature in a range of about ambient temperature to any lower temperature above freezing, or to a temperature in any subrange therein.

8. The method of claim 7, wherein mixing the filtered aqueous coffee extract in the purged conditioning chamber in the presence of the non-oxygen gas comprising hydrogen comprises mixing at a temperature of about 45° F.

9. The method of claim 1, wherein the brewing chamber and the conditioning chamber are separate chambers, and wherein filtering the aqueous coffee extract to remove the majority portion of the undissolved solids to provide the filtered aqueous coffee extract having dissolved solids and some undissolved solids occurs during transfer, under oxygen-free or substantially oxygen-free conditions, of the aqueous coffee extract from the brewing chamber, through the intermediate filtering component, to the conditioning chamber.

10. The method of claim 9, wherein the filtering component is a filtering chamber, and/or an in-line filter unit communicating between the brewing chamber and the conditioning chamber.

11. The method of claim 1, further comprising, during and/or after the mixing and the conditioning in the purged conditioning chamber, further filtering, under oxygen-free or substantially oxygen-free conditions, at least a portion of the filtered aqueous coffee extract to remove an additional portion of the undissolved solids, to provide a conditioned, further filtered aqueous coffee extract having dissolved solids and a lesser amount of undissolved solids.

12. The method of claim 11, further comprising purging the further filtered coffee extract with a mixture of nitrogen and hydrogen gas, and bringing the conditioning chamber to pressure value in a range of about 15-30 psi with the mixture of nitrogen and hydrogen gas, with continuing mixing to provide for exposure of the further filtered coffee extract to the pressurized nitrogen plus hydrogen gas for a time period sufficient to ensure that oxygen is eliminated from the conditioned further filtered coffee extract.

13. The method of claim 12, wherein about 2% hydrogen is present, and wherein exposure of the further filtered coffee extract to the pressurized nitrogen plus hydrogen gas is for a time period selected from the group consisting of 5-40 hours, 10-30 hours, 15-25 hours, and 20-24 hours.

14. The method of claim 1, further comprising transferring, under oxygen-free or substantially oxygen-free conditions, the conditioned further filtered aqueous coffee extract having dissolved and undissolved solids into sealed containers, to provide a packaged cold-brewed beverage having consistent/reproducible organoleptic and nutritional qualities, with enhanced shelf-life.

15. The method of claim 1, wherein the aqueous coffee extract is treated by high pressure processing (HPP) to preclude bacterial growth.

16. The method of claim 15, further comprising after transferring, chilling the packaged cold-brewed beverage to a chilled temperature for storage.

17. The method of claim 16, wherein the shelf-life of the cold-brewed beverage is a time period selected from the group consisting of: at least 90 days, at least 180 days, at least 270 days, at least 360 days, and greater periods, in each case at a storage temperature value in a range of about 34° F. to about 40° F.

18. The method of claim 16, wherein the shelf-life of the cold-brewed beverage is a time period selected from the group consisting of: at least 90 days, at least 180 days, at least 270 days, at least 360 days, and greater periods, in each case at a storage temperature value in a range of about of about 180° F. to any lower temperature above freezing, or to a temperature in any subrange therein.

19. The method of claim 1, wherein, prior to mixing with agitation in the brewing chamber, the coffee is roasted and/or broken up and/or ground to facilitate extraction of the coffee.

20. The method of claim 1, wherein the aqueous medium is filtered and/or deionized water, in each case comprising trace elements and/or a food-safe preservative, antioxidant, or antibacterial agent(s).

21. The method of claim 20, wherein the water is deionized water, or deionized water comprising added trace elements.

22. The method of claim 14, wherein the transferring temperature is a temperature in a range of about 33° F.-180° F.).

23. The method of claim 1, wherein purging the conditioning chamber with non-oxygen gas comprising hydrogen, comprises purging with a gas mixture comprising nitrogen and hydrogen.

24. The method of claim 23, wherein hydrogen is present in an amount of about 2%.

25. The method of claim 1, wherein at least one of the brewing chamber and the conditioning chamber is jacketed to provide for controlled temperature using a cooling fluid pumped through the jacket.

26. The method of claim 1, wherein at least one of the brewing chamber and the conditioning chamber comprises one or more controllable pressure/vacuum port(s) in controlled fluid communication with a vacuum source or the source of non-oxygen gas containing hydrogen to provide for imposing a pressure or a vacuum in the chamber(s).

* * * * *